US008683742B1

(12) United States Patent
Cox

(10) Patent No.: US 8,683,742 B1
(45) Date of Patent: Apr. 1, 2014

(54) AGRICULTURAL SYSTEM

(75) Inventor: Daniel S. Cox, Burlington, NC (US)

(73) Assignee: Klondike Agricultural Products, LLC, Palm Beach Gardens, FL (US)

(*) Notice: Subject to any disclaimer, the term of this patent is extended or adjusted under 35 U.S.C. 154(b) by 231 days.

(21) Appl. No.: 10/779,303

(22) Filed: Feb. 13, 2004

(51) Int. Cl.
*A01C 1/06* (2006.01)

(52) U.S. Cl.
USPC .......................................................... 47/57.6

(58) Field of Classification Search
USPC ............................................ 47/57.6; 504/100
See application file for complete search history.

(56) References Cited

U.S. PATENT DOCUMENTS

| | | | |
|---|---|---|---|
| 1,954,424 A | 4/1934 | Otwell | 47/9 |
| 1,983,815 A | 12/1934 | Schmiett | 47/57 |
| D161,913 S | 2/1951 | Fraim | |
| 2,865,315 A | 12/1958 | Goldstein | 111/92 |
| 3,636,897 A | 1/1972 | Brink | 111/77 |
| 3,770,164 A | 11/1973 | Hembree | 221/211 |
| 3,797,195 A | 3/1974 | Brink et al. | 53/37 |
| 3,884,177 A | 5/1975 | Brink et al. | 118/2 |
| 3,996,865 A | 12/1976 | Dwyer | 47/1 |
| 4,250,660 A * | 2/1981 | Kitamura et al. | 47/57.6 |
| 4,257,216 A | 3/1981 | Eiker, Jr. et al. | 56/14.6 |
| 4,275,672 A | 6/1981 | Clad | 111/99 |
| 4,534,125 A | 8/1985 | Buck | 40/10 |
| D280,882 S | 10/1985 | Rea | D8/210 |
| 4,628,633 A | 12/1986 | Nilsson | 47/57.6 |
| 4,769,945 A * | 9/1988 | Motoyama et al. | 47/57.6 |
| 4,777,762 A * | 10/1988 | Redenbaugh et al. | 47/57.6 |
| 4,779,376 A * | 10/1988 | Redenbaugh | 47/57.6 |
| 4,808,430 A * | 2/1989 | Kouno | 427/4 |
| 4,879,839 A * | 11/1989 | Gago et al. | 47/57.6 |
| 5,010,685 A * | 4/1991 | Sakamoto et al. | 47/57.6 |
| 5,185,023 A | 2/1993 | Webb | 504/117 |
| 5,382,269 A * | 1/1995 | Giroud-Abel et al. | 47/57.6 |
| 5,746,022 A * | 5/1998 | Brown et al. | 47/57.6 |
| 6,007,475 A | 12/1999 | Slater et al. | 600/8 |
| 6,209,259 B1 | 4/2001 | Madigan et al. | 47/57.6 |
| 6,210,316 B1 | 4/2001 | Slater et al. | 600/8 |
| 6,264,599 B1 | 7/2001 | Slater et al. | 600/7 |

FOREIGN PATENT DOCUMENTS

FR  2 519 423  7/1983

OTHER PUBLICATIONS

Maneklal Global Exports Pharmaceutical Machinery, information from the internet; undated, admitted prior art.
Henry Field's Seed & Nursery Co., Seed Germination Times, information from the internet; undated, admitted prior art.
Soroptimist International of Osoyoos Fruit & Veg. Harvest Times, information from the internet, copyright 2002-2003.

* cited by examiner

*Primary Examiner* — David Parsley
(74) *Attorney, Agent, or Firm* — Chowdhury & Georgakis, P.C.

(57) ABSTRACT

An agricultural system including: at least one seed; a growing media in communication with the one seed; a biodegradable outer retainer surrounding a portion of the one seed and the growing media, and; at least one growing media additive.

39 Claims, 4 Drawing Sheets

AGRICULTURAL SYSTEM

BACKGROUND OF THE INVENTION (1) Field of the Invention

The present invention relates generally to an agricultural system and, more particularly, to an agricultural system including: at least one seed; a growing media in communication with the one seed; and an outer retainer surrounding a portion of the one seed and the growing media.

(2) Description of the Prior Art

Agricultural growers such as commercial suppliers and home gardeners produce a wide variety of cultivated crops and plants. Often these suppliers or gardeners raise plants from seeds. Soil may be supplemented with additional water, fertilizers, pH controlling nutrients, and fungicides to support seed germination. This process is labor-intensive and time-consuming, which adds costs to commercial operations and detracts from the enjoyment of gardening for recreational gardeners, especially those advanced in age or physically limited. Likewise, growers raise some cultivated plants from seeds in pots or other small containers. Such a grower often transplants the seedling plant to the ground after an initial period in the container. This process is also labor-intensive and time-consuming.

In recent years, roll out flower gardens have been developed that reduce part of the painstaking work required to grow a home garden. The roll out gardens may consist of seeds within a nutrient rich substrate. These roll out gardens reduce part of the labor associated with growing flower gardens but are bulky and awkward to use, store, and transport.

Thus, there remains a need for a new and improved agricultural system for growing plants that is easy to use, store, and transport, and provides an acceptable level of seed germination.

SUMMARY OF THE INVENTION

The present invention is directed to an agricultural system comprising: at least one seed; a growing media in communication with the one seed, and; an outer retainer surrounding a portion of the one seed and the growing media. In the preferred embodiment of the invention, the outer retainer is biodegradable. Also, in the preferred embodiment of the invention, the system includes at least one growing media additive.

In the preferred embodiment of the invention, the one seed is a non-dormant seed. The system may include at least one secondary seed. The secondary seed may have a longer germination period than the one seed. The secondary seed may have a slower growth period than the one seed. The secondary seed may have a longer life than the one seed.

In the preferred embodiment of the invention, the growing media may be organic. The growing media may be a natural soil. The growing media may be peat moss. The growing media may further include a water component. The wt. % moisture of the growing media may be less than about 50 wt. %. The wt. % moisture of the growing media may be between about 10 and 30 wt. %. The wt. % moisture of the growing media may be about 20 wt. %. The total available moisture of the growing media may be between about 5 and 10 mgs. The total available moisture of the growing media may be about 7 mgs.

In the preferred embodiment of the invention, the biodegradable material of which the outer retainer is comprised may be a capsule. The capsule may be a two-piece capsule. The biodegradable material may be a coating. The biodegradable material may be gelatin-based. The biodegradable material may be cellulosic-based. The outer retainer may include at least one biodegradable material additive. The biodegradable material additive may be a pigment. The biodegradable material additive may be a preservative.

In the preferred embodiment of the invention, the growing media additive may be a protein for promoting germination. The protein may be an amino acid. The growing media additive may be a fertilizer for promoting growth. The growing media additive may be at least one of a fungicide and a pesticide. The growing media additive may be time released.

Accordingly, one aspect of the present invention is to provide an agricultural system comprising: at least one seed; a growing media in communication with the one seed; and an outer retainer surrounding a portion of the one seed and the growing media.

Another aspect of the present invention is to provide a biodegradable outer retainer for an agricultural system having at least one seed in communication with a growing media, the outer retainer being formed of a biodegradable material.

Still another aspect of the present invention is to provide an agricultural system comprising: at least one seed; a growing media in communication with the one seed; a biodegradable outer retainer surrounding a portion of the one seed and the growing media; and at least one growing media additive.

These and other aspects of the present invention will become apparent to those skilled in the art after a reading of the following description of the preferred embodiment when considered with the drawings.

DESCRIPTION OF THE PREFERRED EMBODIMENTS

Figure 1:
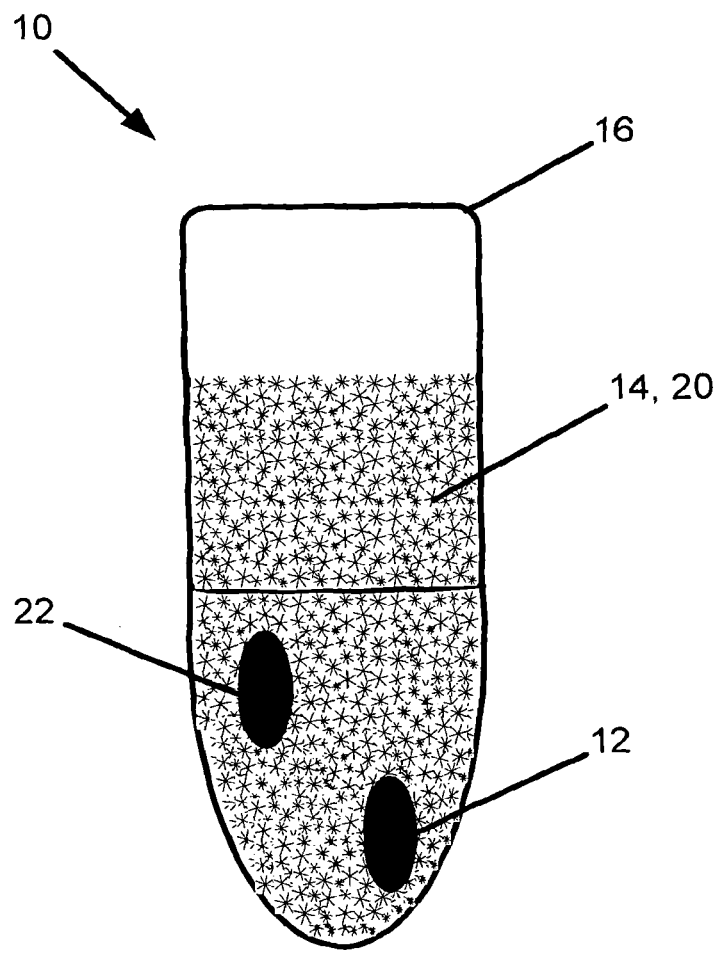
FIG. 1 is a cross-sectional view of the agricultural system constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, the present invention includes at least one seed capable of germination, which incased in a growing media 14, which is held together by an outer retainer 16. The growing media may include one or more traditional media additives 20. In addition, at least one secondary seed 22 may also be used to compliment the primary seed 12.

Figure 2:
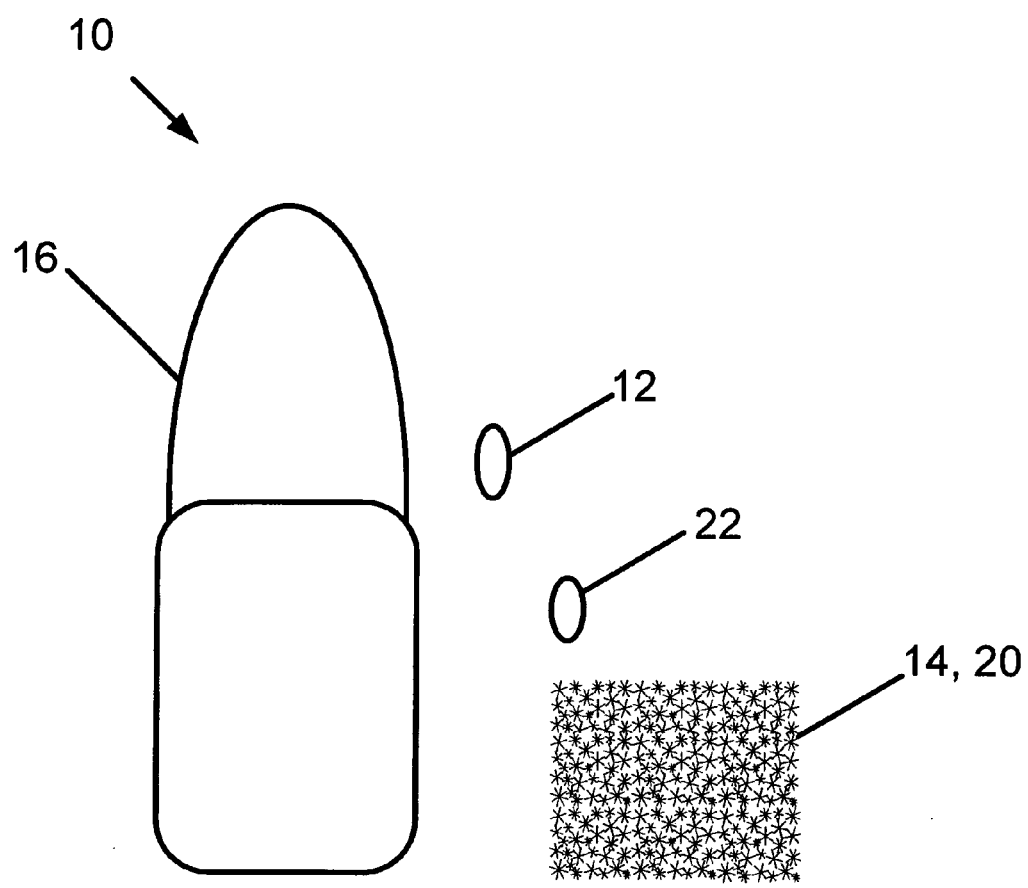
FIG. 2 is an exploded view of the agricultural system shown in FIG. 1 showing the individual components.

As best seen in FIG. 2, the agricultural system 10 components may be divided into three groups. The first group is the plant or flower seed 12 with or without the secondary seed 22. In the preferred embodiment, the plant or flower set will seed is a non-dormant seed. These types of seeds are the most common agricultural and garden type seeds which, unlike gumballs, pinecones and peanuts do not normally have a natural outer protective shell.

Secondary seed 22, may actually include one or more seeds, which may have either a longer germination period and therefore begin to grow after the primary seed or they may have a slower growth period and overtake the primary seed plant or they may have a longer life and remain after the primary seed plant has died. The following table shows examples of primary and secondary seeds having these combinations.

TABLE I

|  | Primary Seed | Secondary Seed |
|---|---|---|
| Secondary Seed has a Greater Growth and Germination Period than Primary Seed | onions | peppers |
| Secondary Seed has a Shorter Growth Period than Primary Seed | corn | potatoes |
| Secondary Seed has a Longer Life than Primary Seed | beets | beans |

As seen in Table I above, the primary seed may be of a first species or type and the secondary seed may be of a second species or type, where the second species differs from the first species. In particular, the second species may have a longer germination (and growth) period than the first species, a shorter growth period than the first species, and/or a longer life than the first species.

Growing media 14 preferably is an organic material and most preferably a natural soil such as peat. However, it will be appreciated that the growing media may also include inorganic or organic fillers such as conventionally used in seed starting pots.

Figure 3:
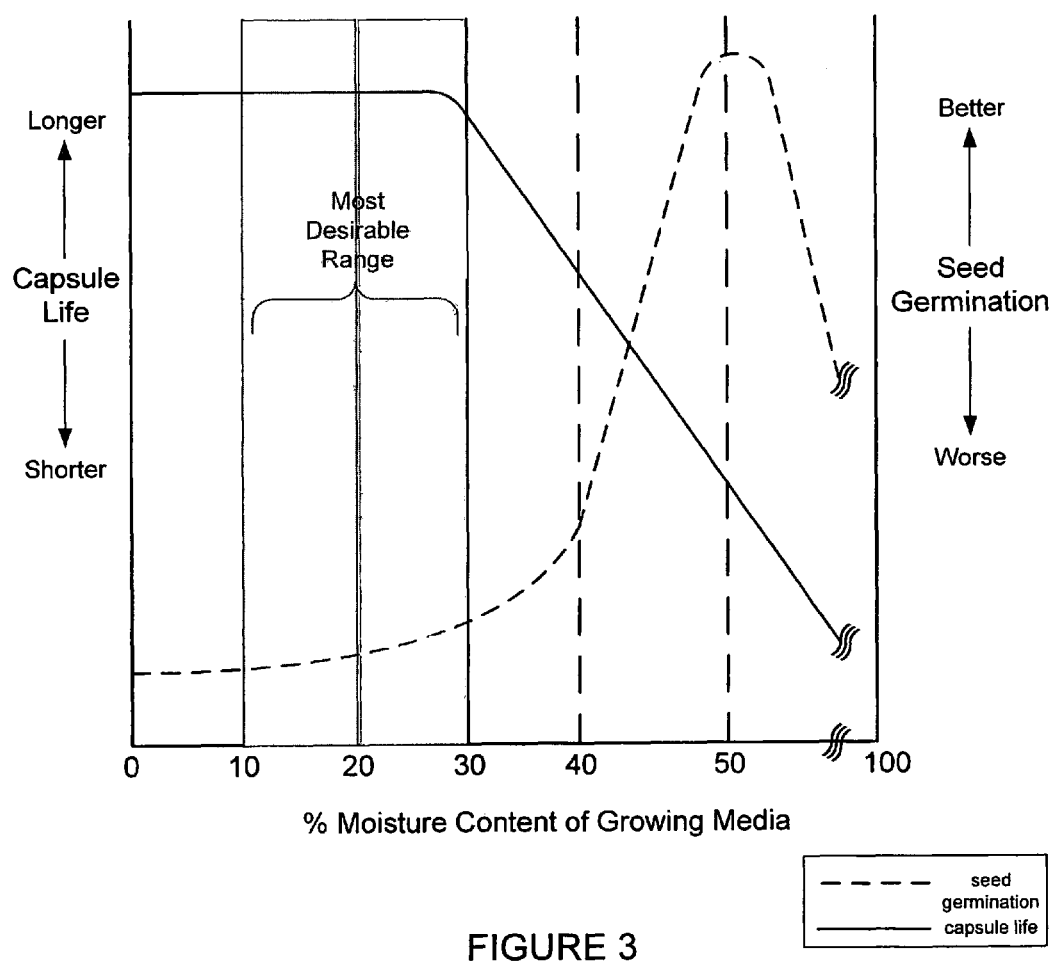
FIG. 3 is a graphical representation of the relationship between capsule life and seed germination as a function of percent moisture of the growing media.

A primary purpose of the growing media is to control the moisture content within the outer retainer 16. As can be seen in FIG. 3, the capsule life for most suitable materials drops off quickly as percent moisture of the growing media increases over about 40 percent. At the same time the germination of the seed 12 increases sharply when the percent moisture content of the growing media increases above 40 percent. Currently in the preferred embodiment the percent moisture content of the growing media is less than about 50 percent to promote capsule life and reduce germination. In the preferred embodiment the percent moisture of the growing media is between about 10-30 percent with about 20 percent moisture of the growing media being the preferred embodiment. Reducing the percent moisture of the growing media further may result in damage to the seed and it is much more costly to dry the growing media to lower its percentage the moisture.

Figure 4:
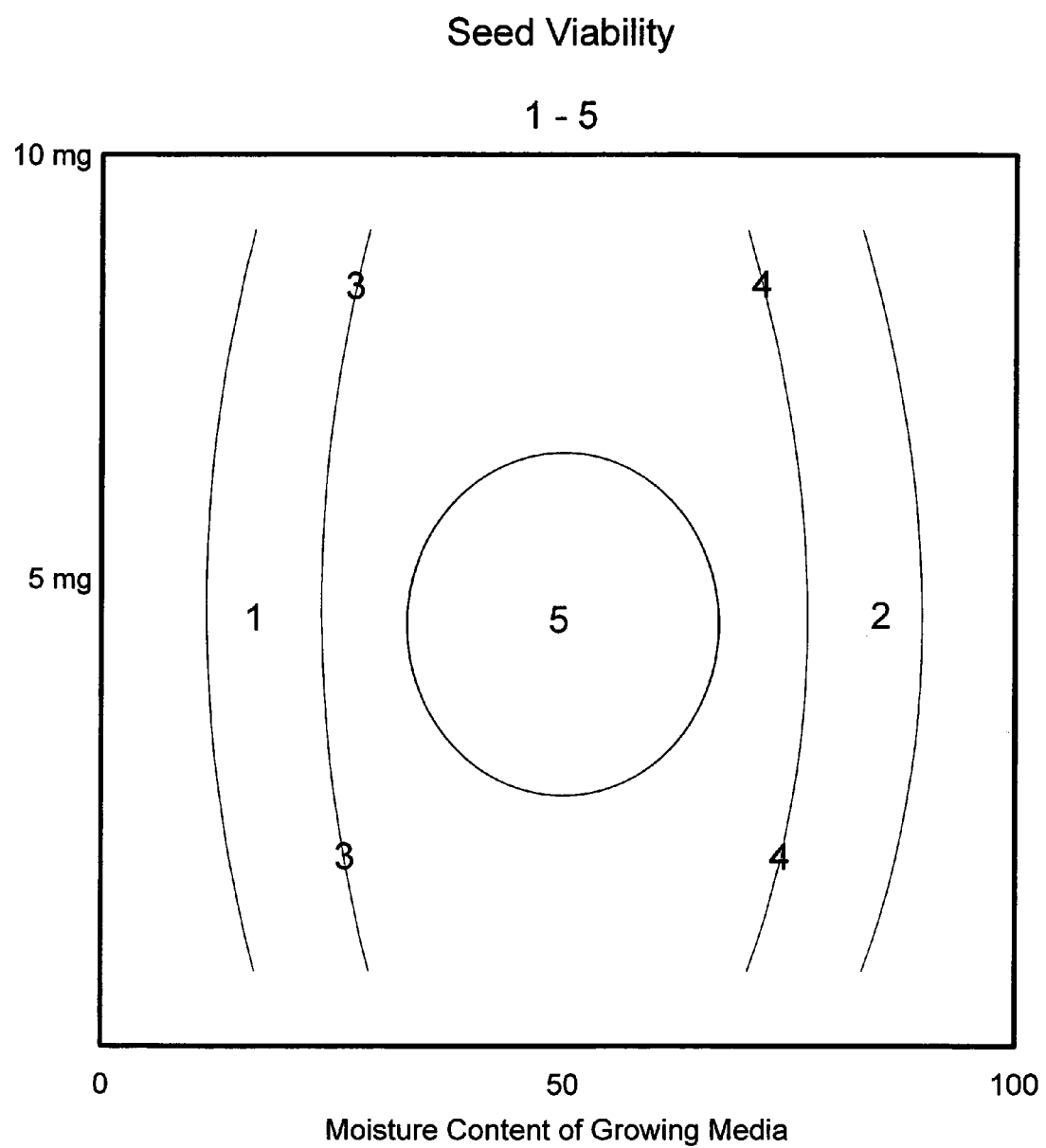
FIG. 4 is a graphical representation of the seed viability as a function of the percent moisture of the growing media and the total available moisture in milligrams on a 1-5 scale.

Turning to FIG. 4, there is shown a graphical representation of seed viability as a function of the percent moisture in the growing media and the total available moisture "TAM". As can be seen, seed viability increases rapidly with the increase in percent moisture of the growing media reaching a maximum but then dropping off as the growing media moisture content becomes so high as to "drown" the seed. While not as critical the total available moisture in milligrams results in an increase in seed viability as total available moisture reaches about five milligrams but then begins to drop off as is increased past about 10 milligrams.

In the preferred embodiment outer retainer 16 is a biodegradable material and in preferred embodiment is a capsule such as a two-piece capsule, which can be produced on a model CS-M2 capsule machine available from Maneklal Global Exports of 237/239 Perin Nariman Street Fort, Mumbai— 400 001, India. These types of capsules are typically gelatin based which are water-soluble, but may also be produced with a cellulosic base. In an alternative embodiment the seed 12 and growing media 14 are pre-pressed into a low-density pellet using a conventional pill forming machine and then the outer retainer 16 is applied as a coating using, for example an Auto Coater coating machine, also available from Maneklal Global Exports of India.

In the preferred embodiment outer retainer 16, biodegradable material may also include at least one capsule additive such as a pigment or a solid preservative such as propanate or titanium dioxide to provide additional functions such as improved ease of identification of the seed 12 within the outer retainer 16 or to extend the shelf life of the outer retainer 16.

In the preferred embodiment the growing media 14 may further include additional growing media additives 20. For example, the growing media 14 may include a protein to facilitate plant germination. Organic proteins enzymes such as those in fish oils, peanut oils, and bark composts have been found to be specifically suitable for this purpose. In addition the media additive 20 may include conventional fertilizers such as to provide additional phosphate, nitrogen or other mineral pro-specific type of seed or soil condition. In addition the media additive 20 may also include conventional fungicides and/or pesticides depending on the needs of the particular growing condition. Finally, the media additive 20 may also be micro-encapsulated or otherwise treated to provide a time release of the media additive over a predetermined period of the early germination of the seed 12.

Certain modifications and improvements will occur to those skilled in the art upon a reading of the foregoing description. By way of example, other combinations and media formulas may be used as desired for the particular seed of the agricultural system. Also, if desired, the outer retainer for the agricultural system may include a fertilizer for promoting the growth of the particular seed into maturity. All such modifications and improvements have been deleted herein for the sake of conciseness and readability but are properly within the scope of the following claims.

I claim:

1. An agricultural system, said system comprising:
    (a) at least one primary seed of a first species and at least one secondary seed of a second species, wherein the second species differs from the first species;
    (b) a growing media in communication with said at least one primary seed and said at least one secondary seed, wherein said growing media includes moisture in the amount of between about 10 and 40 wt. % of said growing media; and
    (c) a two-piece, generally tubular capsule surrounding said at least one primary seed, said at least one secondary seed and said growing media, wherein each piece of said capsule includes a closed end and an open end and wherein said open ends of each piece are joined together to form said generally tubular capsule.

2. The system according to claim 1, further including at least one growing media additive.

3. The system according to claim 2, wherein said growing media additive comprises a protein for promoting germination.

4. The system according to claim 3, wherein said protein includes an amino acid.

5. The system according to claim 2, wherein said growing media additive comprises a fertilizer for promoting growth.

6. The system according to claim 2, wherein said growing media additive comprises at least one of a fungicide and a pesticide.

7. The system according to claim 2, wherein said growing media additive is time released.

8. The system according to claim 1, wherein said at least one primary seed is a non-dormant seed.

9. The system according to claim 1, wherein said growing media is organic.

10. The system according to claim 9, wherein said growing media comprises a material selected from the group consisting of a natural soil and peat moss.

11. The system according to claim 1, wherein the wt. % moisture of said growing media is between about 10 and 30 wt. % of said growing media.

12. The system according to claim 11, wherein the wt. % moisture of said growing media is about 20 wt. % of said growing media.

13. The system according to claim 1, wherein the total weight of said moisture is between about 5 and 10 milligrams.

14. The system according to claim 13, wherein the total weight of said moisture is about 7 milligrams.

15. The system according to claim 1, wherein the second species has a longer germination period than the first species, a shorter growth period than the first species, and/or a longer life than the first species.

16. The system according to claim 1, wherein said growing media does not comprise a gel.

17. The system according to claim 1, wherein said growing media is not adherent.

18. The system according to claim 1, wherein said growing media is not adherent.

19. An agricultural system, said system comprising:
  (a) at least one primary seed of a first species and at least one secondary seed of a second species, wherein the second species differs from the first species;
  (b) a growing media in communication with said at least one primary seed and said at least one secondary seed, wherein said growing media includes moisture in the amount of between about 10 and 40 wt. % of said growing media;
  (c) a two-piece, generally tubular capsule surrounding said at least one primary seed, said at least one secondary seed and said growing media, wherein each piece of said capsule includes a closed end and an open end and wherein said open ends of each piece are joined together to form said generally tubular capsule; and
  (d) at least one growing media additive.

20. The system according to claim 19, wherein said growing media additive comprises a protein for promoting germination.

21. The system according to claim 20, wherein said protein is an amino acid.

22. The system according to claim 19, wherein said growing media additive comprises a fertilizer for promoting growth.

23. The system according to claim 19, wherein said growing media additive comprises at least one of a fungicide and a pesticide.

24. The system according to claim 19, wherein said growing media additive is time released.

25. The system according to claim 19, wherein said at least one primary seed is a non-dormant seed.

26. The system according to claim 19, wherein said growing media is organic.

27. The system according to claim 26, wherein said growing media comprises a material selected from the group consisting of a natural soil and peat moss.

28. The system according to claim 19, wherein the wt. % moisture of said growing media is between about 10 and 30 wt. % of said growing media.

29. The system according to claim 28, wherein the wt. % moisture of said growing media is about 20 wt. % of said growing media.

30. The system according to claim 19, wherein the total weight of said moisture is between about 5 and 10 milligrams.

31. The system according to claim 30, wherein the total weight of said moisture is about 7 milligrams.

32. The system according to claim 19, wherein said two-piece capsule is a coating.

33. The system according to claim 19, wherein said two-piece capsule is gelatin-based.

34. The system according to claim 19, wherein said two-piece capsule is cellulosic-based.

35. The system according to claim 19 further including at least one biodegradable material additive.

36. The system according to claim 35, wherein said biodegradable material additive is a pigment.

37. The system according to claim 35, wherein said biodegradable material additive is a preservative.

38. The system according to claim 19, wherein the second species has a longer germination period than the first species, a shorter growth period than the first species, and/or a longer life than the first species.

39. The system according to claim 19, wherein said growing media does not comprise a gel.

* * * * *